United States Patent
Lu et al.

(10) Patent No.: US 10,033,521 B2
(45) Date of Patent: Jul. 24, 2018

(54) METHOD FOR TRAINING TIME SLOT SYNCHRONIZATION OF NODES IN OPTICAL BURST TRANSPORT NETWORK, NODE DEVICE AND NETWORK

(71) Applicant: ZTE Corporation, Shenzhen (CN)

(72) Inventors: Wei Lu, Shenzhen (CN); Yingchun Shang, Shenzhen (CN); Huilong Xia, Shenzhen (CN); Sheping Shi, Shenzhen (CN); Lei Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/112,593

(22) PCT Filed: Aug. 11, 2014

(86) PCT No.: PCT/CN2014/084128
§ 371 (c)(1),
(2) Date: Jul. 19, 2016

(87) PCT Pub. No.: WO2015/109819
PCT Pub. Date: Jul. 30, 2015

(65) Prior Publication Data
US 2016/0337115 A1  Nov. 17, 2016

(30) Foreign Application Priority Data

Jan. 22, 2014 (CN) .......................... 2014 1 0030840

(51) Int. Cl.
*H04B 10/275* (2013.01)
*H04L 7/00* (2006.01)
(Continued)

(52) U.S. Cl.
CPC ......... *H04L 7/0075* (2013.01); *H04B 10/275* (2013.01); *H04L 12/4035* (2013.01);
(Continued)

(58) Field of Classification Search
CPC combination set(s) only.
See application file for complete search history.

(56) References Cited

U.S. PATENT DOCUMENTS

2002/0118419 A1   8/2002   Zheng
2002/0118420 A1   8/2002   Liu
(Continued)

FOREIGN PATENT DOCUMENTS

CN   201278544 Y   7/2009
CN   102726058 A   10/2012
(Continued)

OTHER PUBLICATIONS

International Search Report for corresponding application No. PCT/CN2014/084128 filed on Aug. 11, 2014; dated Nov. 19, 2014.
(Continued)

*Primary Examiner* — David Payne
*Assistant Examiner* — Omar S Ismail
(74) *Attorney, Agent, or Firm* — Cantor Colburn LLP (57) ABSTRACT

The present disclosure discloses a method for training time slot synchronization of nodes in an Optical Burst Transport Network (OBTN), a node device and a network. The method includes that: a node trains a reference time delay between receiving of a control frame and receiving of a data frame, wherein the data frame and the control frame are within one period; and the node trains a sending time slot between sending of adjacent data packets in the data frame.

17 Claims, 5 Drawing Sheets

(51) Int. Cl.
  *H04L 12/403*   (2006.01)
  *H04L 12/42*    (2006.01)
  *H04Q 11/00*    (2006.01)

(52) U.S. Cl.
  CPC ....... *H04L 12/422* (2013.01); *H04Q 11/0062* (2013.01); *H04Q 11/0067* (2013.01); *H04Q 2011/0079* (2013.01); *H04Q 2011/0092* (2013.01)

(56) References Cited

U.S. PATENT DOCUMENTS

| | | | |
|---|---|---|---|
| 2005/0175341 A1* | 8/2005 | Ovadia | H04L 29/06 398/43 |
| 2006/0146888 A1 | 7/2006 | Den Hollander | |
| 2010/0118721 A1 | 5/2010 | Sakurada | |
| 2013/0051798 A1 | 2/2013 | Chen | |
| 2015/0131991 A1* | 5/2015 | Hattori | H04J 14/0212 398/47 |

FOREIGN PATENT DOCUMENTS

| | | |
|---|---|---|
| EP | 1401233 A2 | 3/2004 |
| EP | 2182789 A1 | 5/2010 |
| WO | 2013187474 A1 | 12/2013 |

OTHER PUBLICATIONS

Mingwu Yao, et al., "VS-OBR: A Confliction-fee Virtual Synchronization Optical Burst Ring", Chinese Journal of Electronics, vol. 38, No. 7, Jul. 31, 2010.

European Search Report for corresponding application EP 14 87 9557; Report dated Dec. 23, 2016.

Supplementary European Search Report Application No. EP14880086; dated Jan. 13, 2017; pp. 7.

* cited by examiner

Fig. 8

METHOD FOR TRAINING TIME SLOT SYNCHRONIZATION OF NODES IN OPTICAL BURST TRANSPORT NETWORK, NODE DEVICE AND NETWORK

TECHNICAL FIELD

The present disclosure relates to the technical field of optical networks, and in particular to a method for training time slot synchronization of nodes in an Optical Burst Transport Network (OBTN), a node device and a network.

BACKGROUND

An OBTN is an optical transmission technology of which a granularity is between Optical Circuit Switching (OCS) and Optical Packet Switching (OPS). A key idea is to separate a control channel from a data channel by fully utilizing the huge bandwidth of an optical fibre and the flexibility of electronic control. The data channel conducts an all-optical switching technology by adopting data frames, wherein for the data frames, an Optical Burst (OB) is taken as a switching unit. The control frames in the control channel corresponds to the data frames in an one-to-one manner, and the control frames are also transmitted in an optical domain, and are, however, converted, at a node, to a circuit domain to be processed so as to receive and update corresponding control information. It can be understood that: there may be more than one data channel and more than one control channel. When bursts on a plurality of data channels compete in output, a burst in each data channel may be delayed by using a segment of Fibre Delay Line (FDL), and delay time is exactly equal to time for processing a control frame by each node, thereby making up for a time delay difference between the control channels and the data channels to solve the problem of competitions. Thus, the OBTN can achieve dynamic adaption and good support to various traffic scenarios, can improve the utilization efficiency of resources and the network flexibility, retains the advantages of high speed, high capacity and low cost of an optical layer, and is applied to various star/tree/ring-shaped network topologies.

However, in a current OBTN technology, high cost will be brought by using the FDL. Meanwhile, such a time slot synchronization method is not simple and easy, it is necessary to fix an optical fibre distance between the adjacent nodes and to fix a distance relationship between the control channel and the data channel, and establishment and adjustment are not facilitated when the ring length of the network changes.

SUMMARY

In order to solve the technical problems existing currently, the embodiments of the present disclosure provide a method for training time slot synchronization of nodes in an OBTN, a node device and a network.

According to a first aspect, an embodiment of the present disclosure provides a method for training time slot synchronization of nodes in an OBTN, which may include that:

a node trains a reference time delay between receiving of a control frame and receiving of a data frame, wherein the data frame and the control frame are within one period; and the node trains a sending time slot between sending of adjacent data packets in the data frame.

According to a first possible implementation mode and the first aspect, the step that the node trains the reference time delay between receiving of the control frame and receiving of the data frame may include that:

the node takes a time delay, between first time at which a frame header of the control frame is received and second time at which a frame header of the data frame is received, as the reference time delay between receiving of the control frame by the node and receiving of the data frame by the node.

According to a second possible implementation mode and the first aspect, when the node is a master node, the step that the node trains the sending time slot between sending of the adjacent data packets in the data frame may include that:

the master node sets the sending time slot between sending of the adjacent data packets in the data frame as a first time slot.

According to a third possible implementation mode and any one of the first aspect, the first possible implementation mode and the second possible implementation mode, when the node is the master node, the method may further include that:

the master node sends the data frame after a preset time interval with respect to time of sending the control frame.

According to a fourth possible implementation mode and the first aspect, when the node is a slave node, the step that the node trains the sending time slot between sending of the adjacent data packets in the data frame may include that:

the slave node acquires a first time slot and a second time slot between the adjacent data packets in the data frame;

the slave node obtains a time slot difference of the slave node according to the first time slot and the second time slot; and the slave node adjusts a time slot between sending of the adjacent data packets in the data frame to the first time slot according to the time slot difference when sending the data frame.

According to a fifth possible implementation mode and the fourth possible implementation mode, the step that the slave node acquires the first time slot between the adjacent data packets in the data frame may include that:

the slave node acquires the first time slot from the control frame;

or the slave node receives a data frame sent after a previous node of the slave node completes training, and takes a time slot between sending adjacent data packets in the received data frame as a first time slot.

According to a sixth possible implementation mode and the fourth possible implementation mode, the step that the slave node acquires the second time slot between receiving of the adjacent data packets in the data frame may include that:

the slave node inserts a test data packet between a first data packet and a second data packet in the data frame to obtain a processed data frame;

the slave node sends the processed data frame to a next node of the slave node; and the slave node receives the second time slot sent by the master node, wherein the second time slot is obtained according to a time slot between the first data packet and the test data packet when the next node of the slave node receives the processed data frame, and the next node of the slave node sends the second time slot to the master node, to enable the master node to send the second time slot to the slave node.

According to a second aspect, an embodiment of the present disclosure provides a node device, which may include:

a receiving element, configured to receive a control frame and a data frame;

a first training element, configured to train a reference time delay between receiving of a control frame via the receiving element and receiving of a data frame via the receiving element, wherein the data frame and the control frame are within one period; and a second training element, configured to train a sending time slot between sending of adjacent data packets in the data frame.

According to a first possible implementation mode and the second aspect, the first training element may be configured to take a time delay, between first time at which a frame header of the control frame is received by the receiving element and second time at which a frame header of the data frame is received by the receiving element, as the reference time delay between receiving of the control frame by the node and receiving of the data frame by the node.

According to a second possible implementation mode and the second aspect, when the node device is a master node, the second training element may be configured to set the sending time slot between sending of the adjacent data packets in the data frame as a first time slot.

According to a third possible implementation mode and any one of the second aspect, the first possible implementation mode and the second possible implementation mode, when the node device is the master node, the node device may further include a sending element, configured to send the data frame after a preset time interval with respect to time of sending the control frame.

According to a fourth possible implementation mode and the second aspect, when the node device is a slave node, the second training element may include:

a time slot acquiring sub-element, configured to acquire a first time slot and a second time slot between the adjacent data packets in the data frame;

a time slot difference acquiring sub-element, configured to obtain a time slot difference of the slave node according to the first time slot and the second time slot; and an adjusting element, configured to adjust a time slot between the adjacent data packets in the data frame as the first time slot according to the time slot difference when sending the data frame.

According to a fifth possible implementation mode and the fourth possible implementation mode, the time slot acquiring sub-element may be configured to: acquire the first time slot from the control frame;

or receive a data frame sent after a previous node of the slave node completes training, and take a time slot between adjacent data packets in the received data frame as a first time slot.

According to a sixth possible implementation mode and the fourth possible implementation mode, the time slot acquiring sub-element may be configured to: insert a test data packet between a first data packet and a second data packet in the data frame to obtain a processed data frame; send the processed data frame to a next node of the slave node; and receive the second time slot sent by the master node, wherein the second time slot is obtained according to a time slot between the first data packet and the test data packet when the next node of the slave node receives the processed data frame, and the next node of the slave node sends the second time slot to the master node, to enable the master node to send the second time slot to the slave node.

According to a third aspect, an embodiment of the present disclosure provides an OBTN, which may include a master node device and a slave node device, the master node device comprising the node device according to any one of the second aspect, the first possible implementation mode, the second possible implementation mode and the third possible implementation mode, and the slave node device comprising the node device according to any one of the second aspect, the first possible implementation mode, the fourth possible implementation mode, the fifth possible implementation mode and the sixth possible implementation mode.

According to a fourth aspect, an embodiment of the present disclosure provides a computer storage medium. The computer storage medium may include a set of instructions. When the instructions are executed, at least one processor may be triggered to execute the method for training time slot synchronization of nodes in an OBTN.

The embodiments of the present disclosure provide a method for training time slot synchronization of nodes in an OBTN, the node device and the network. In the processes of receiving and sending the control frame and the data frame, each node trains a reference time delay between receiving of the control frame and receiving of the data frame and a sending time slot between sending of the adjacent data packets in the data frame, so that it is unnecessary to use an FDL in organization of the OBTN, thereby reducing the cost for establishing the OBTN; and a distance between adjacent nodes can flexibly adapt to a network organization physical environment, and it is also unnecessary to strictly fix a distance relationship between a control channel and a data channel, thereby achieving flexible construction of the OBTN.

BRIEF DESCRIPTION OF THE DRAWINGS

In the drawings (drawn in proportion not necessarily), similar drawing marks may describe similar components in different drawings. The similar drawing marks having different letter suffixes may represent different examples of the similar components. The drawings substantially show all embodiments discussed herein in a mode of example giving instead of a mode of limitation.

DETAILED DESCRIPTION OF THE EMBODIMENTS

The technical solutions in the embodiments of the present disclosure are clearly and completely described below with reference to the drawings in the embodiments of the present disclosure. Obviously, the described embodiments are merely a part of the embodiments of the present disclosure, not all of the embodiments. On the basis of the embodiments of the present disclosure, all other embodiments obtained on the premise of no creative work of those skilled in the art shall fall within the protection scope of the present disclosure.

A control channel and a data channel are separated in an OBTN. An all-optical switching technology is conducted on the data channel by adopting data frames, wherein for the data frames, an OB is taken as a switching unit. The control frames in the control channel corresponds to data frames in an one-to-one manner. The control frames are also transmitted in an optical domain, and are, however, converted, at a node, to a circuit domain to be processed so as to receive and update corresponding control information. Thus, the OBTN can become an optical transmission technology with a granularity between OCS and OPS. The OBTN can achieve dynamic adaption and good support to various traffic scenarios, can improve the utilization efficiency of resources and the network flexibility, retains the advantages of high speed, high capacity and low cost of an optical layer, and is applied to various star/tree/ring-shaped network topologies.

Figure 1:
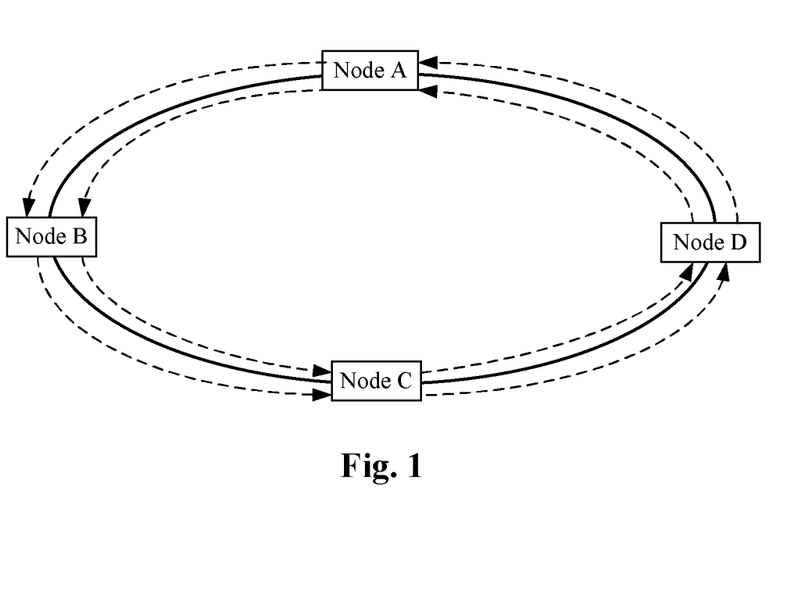
FIG. 1 is a diagram of an application scenario provided by an embodiment of the present disclosure.

FIG. 1 shows an application scenario provided by an embodiment of the present disclosure. There are nodes A, B, C and D in an OBTN having a ring-shaped topological structure, wherein the node A may be configured as a master node, and the nodes B, C and D may be configured as slave nodes. A black full line circle represents a schematic diagram of a loop structure, dotted arrows inside the black full line circle represent a transmission direction of a data channel and a data frame, and dotted arrows outside the black full line circle represent a transmission direction of a control channel and a control frame. Exemplarily, in FIG. 1, two data wavelengths are set in the data channel, one control wavelength is set in the control channel, and it can be understood that the diagram is merely intended to exemplarily explain the technical solution of the embodiment of the present disclosure, and does not have any limitation function.

Figure 2:
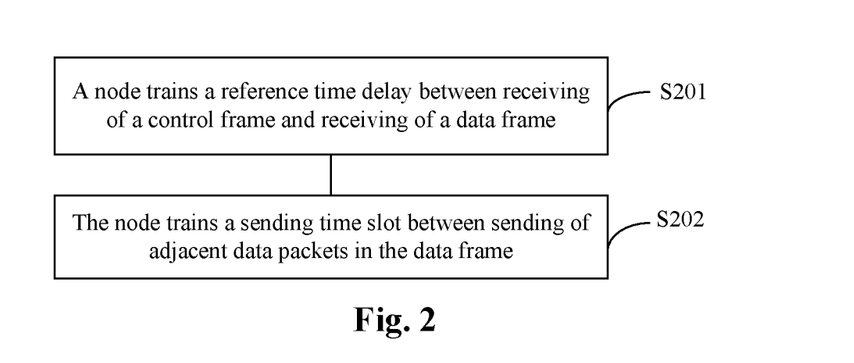
FIG. 2 is a flow diagram of a method for training time slot synchronization of nodes in an OBTN provided by an embodiment of the present disclosure.

FIG. 2 shows a flow of a method for training time slot synchronization of nodes in an OBTN provided by an embodiment of the present disclosure with reference to the application scenario shown in FIG. 1. The flow may include that:

S201: A node trains a reference time delay between receiving of a control frame and receiving of a data frame, wherein the data frame and the control frame are within one period.

Exemplarily, the step that the node trains the reference time delay between receiving of the control frame and receiving of the data frame includes that: the node takes a time delay, between first time at which a frame header of the control frame is received and second time at which a frame header of the data frame is received, as the reference time delay between receiving of the control frame by the node and receiving of the data frame by the node.

S202: The node trains a sending time slot between sending of adjacent data packets in the data frame.

Exemplarily, when the node is a master node, the step that the node trains the sending time slot between sending of the adjacent data packets in the data frame includes that: the master node sets the sending time slot between sending of the adjacent data packets in the data frame as a first time slot.

Exemplarily, when the node is a slave node, the step that the node trains the sending time slot between sending of the adjacent data packets in the data frame includes that:
the slave node acquires a first time slot and a second time slot between the adjacent data packets in the data frame;
the slave node obtains a time slot difference of the slave node according to the first time slot and the second time slot; and
the slave node adjusts a time slot between sending of the adjacent data packets in the data frame to the first time slot according to the time slot difference when sending the data frame.

Furthermore, the step that the slave node acquires the first time slot between sending of the adjacent data packets in the data frame includes that:
the slave node acquires the first time slot from the control frame;
or
the slave node receives a data frame sent after a previous node of the slave node completes training, and takes a time slot between sending of adjacent data packets in the received data frame to a first time slot.

Furthermore, the step that the slave node acquires the second time slot between receiving of the adjacent data packets in the data frame includes that:
the slave node inserts a test data packet between a first data packet and a second data packet in the data frame to obtain a processed data frame;
the slave node sends the processed data frame to a next node of the slave node; and
the slave node receives the second time slot sent by the master node, wherein the second time slot is obtained according to a time slot between the first data packet and the test data packet when the next node of the slave node receives the processed data frame, and the next node of the slave node sends the second time slot to the master node, to enable the master node to send the second time slot to the slave node.

Exemplarily, when the node is the master node, the method further includes that:
the master node sends the data frame after a preset time interval with respect to time of sending the control frame.

The embodiment of the present disclosure provides the method for training time slot synchronization of nodes in an OBTN. In the processes of receiving and sending the control frame and the data frame, each node trains the reference time delay between receiving of the control frame and receiving of the data frame, and trains the sending time slot between sending of the adjacent data packets in the data frame, so that it is unnecessary to use an FDL in organization of the OBTN, thereby reducing the cost for establishing the OBTN; and a distance between adjacent nodes can flexibly adapt to a network organization physical environment, and it is also unnecessary to strictly fix a distance relationship between a control channel and a data channel, thereby achieving flexible construction of the OBTN.

Figure 3:
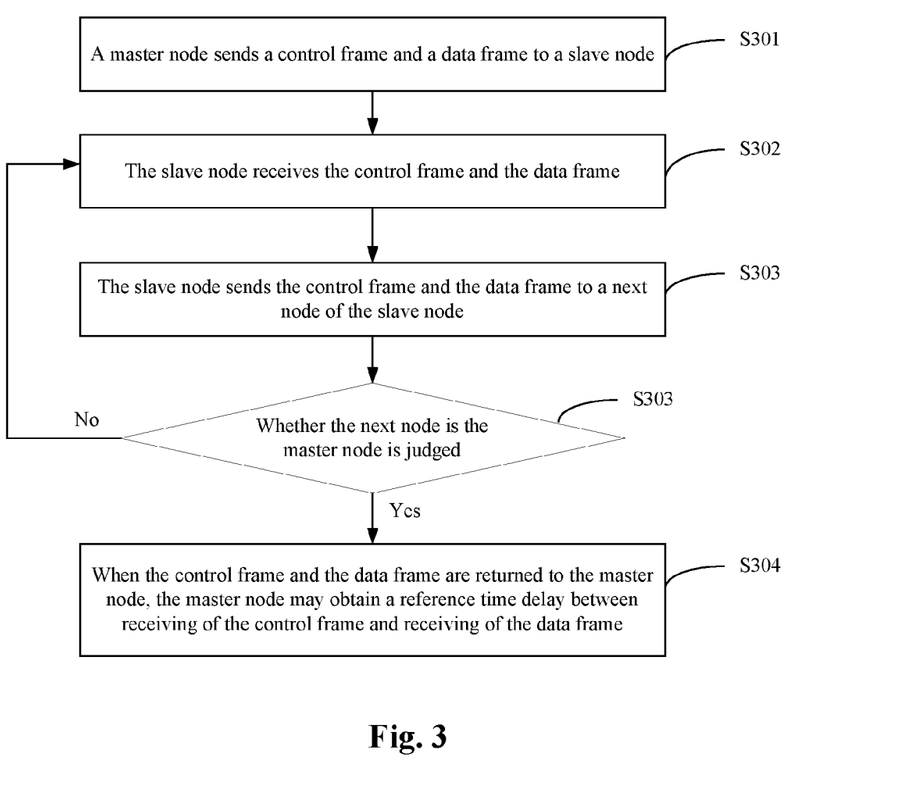
FIG. 3 is a detailed flow diagram of a method for training time slot synchronization of nodes in an OBTN provided by an embodiment of the present disclosure.

FIG. 3 shows a detailed flow diagram of a method for training time slot synchronization of nodes in an OBTN provided by an embodiment of the present disclosure. With reference to the application scenario shown in FIG. 1, a process of training time slot synchronization of all nodes in FIG. 1 is illustrated. From FIG. 1, it may be seen that the node A is a master node in a network topology schematic diagram, the other nodes are slave nodes, and in this case, a specific process of training the time slot synchronization of all nodes may include the steps as follows.

S301: The master node sends a control frame and a data frame to the slave nodes.

Figure 4:
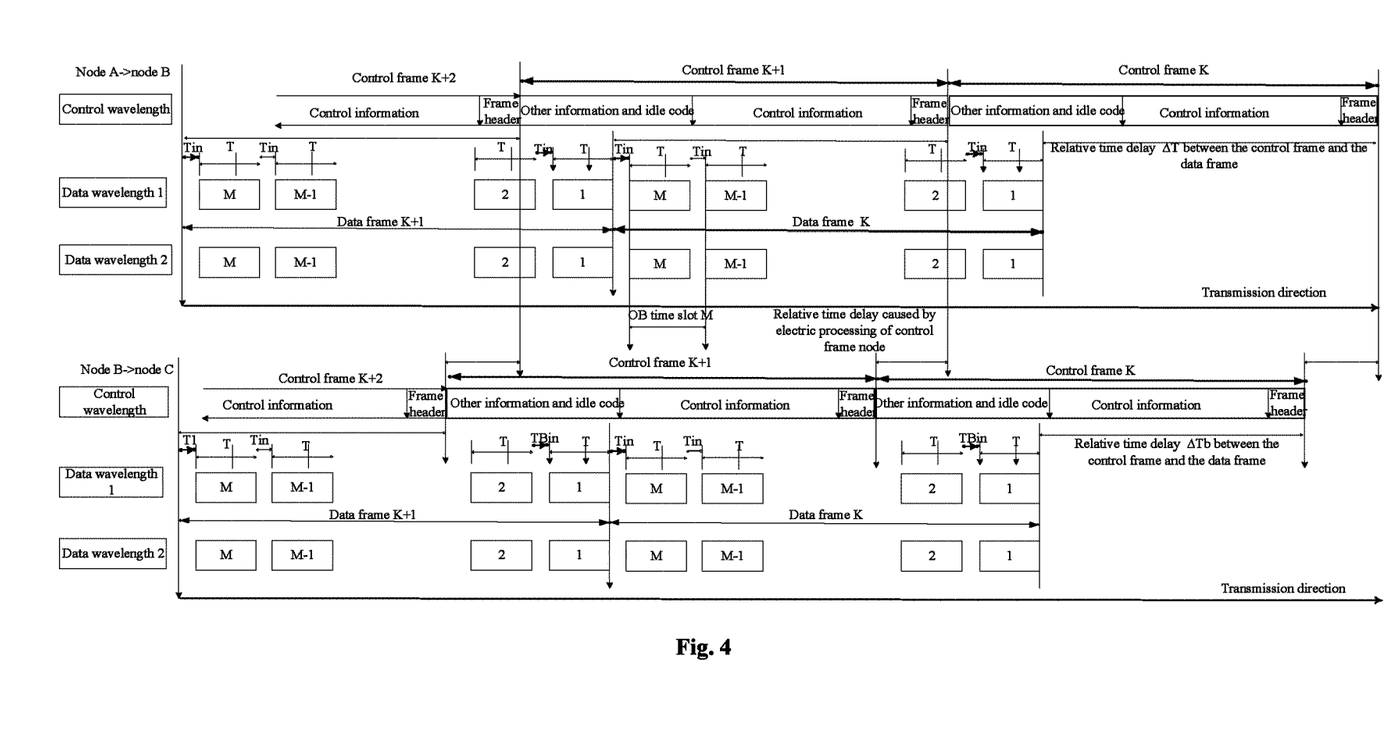
FIG. 4 is a diagram of a time sequence for sending a control frame and a data frame provided by an embodiment of the present disclosure.

It can be understood that: the control frame and the data frame are within one sending period. In the embodiment, an upper half part of FIG. 4 shows a diagram of a time sequence for sending a control frame and a data frame from a node A to a node B. K represents a sequence number of a sending period, and the control frame and the data frame having the same sequence number are within one sending period.

Within one sending period, the data frame includes M data packets, and the length of each data packet is set as T. It may be known that after the node A sends the control frame to the node B via a control channel, a data frame is sent to the node B via a data channel after a preset time interval ΔT, so that after the node B receives the control frame, there may be sufficient time for the node B to process the received control frame, and then to execute operations such as receiving, processing and sending on the data frame; moreover, when the data frame is sent, a time slot between sending of adjacent data packets in the data frame may be set as a first time slot $T_{in}$; and in this case, the first time slot $T_{in}$ may be taken as a result of training a sending time slot between sending of the adjacent data packets in the data frame by the master node, and the master node completes training on the sending time slot between sending of the adjacent data packets in the data frame. It can be understood that: the preset time interval ΔT and the first time slot $T_{in}$ may be considered as control information and written into the control frame.

S302: The slave node receives the control frame and the data frame.

Exemplarily, as shown in a bottom half part of FIG. 4, the node B receives the control frame and the data frame sent by the node A, and trains a reference time delay $\Delta T_b$ between receiving of the control frame and receiving of the data frame.

Optionally, the training process may refer to that: the node B records time $T_1$ of receiving a frame header of the control frame and records time $T_2$ of receiving a frame header of the data frame, wherein the control frame and the data frame are within one period. In this case, the reference time delay $\Delta T_b$ between receiving of the control frame by the node B and receiving of the data frame by the node B may be $\Delta T_b = T_1 - T_2$.

Optionally, the training process may refer to that: the node B receives the frame header of the control frame, and acquires, from the control information in the control frame, the preset time interval ΔT between sending of the control frame via the node A and sending of the data frame via the node A. Due to the characteristic that a control channel and a data channel from the node A to the node B have different optical path, and due to reasons such as time consumed by photoelectric conversion of the control frame, time consumed by the control frame from the node A to the node B is shorter than time consumed by the data frame by $T_{ab}$, and in this case, the reference time delay $\Delta T_b$ between receiving of the control frame via the node B and receiving of the data frame via the node B may be $\Delta T_b = \Delta T - T_{ab}$.

It is important to note that: when the node B receives the data frame in the future after learning the reference time delay $\Delta T_b$ between receiving of the control frame and receiving of the data frame, receiving time of the frame header of the control frame is taken as a reference clock criterion, it is prejudged that for the reference time delay $\Delta T_b$ after the reference clock criterion, a frame header of a data signal will appear, and therefore an accurate time point of receiving the data frame is presumed.

Exemplarily, in the process of receiving the data frame, the node B may acquire, according to the control information in the control frame, the first time slot $T_{in}$ between sending of the adjacent data packets in the data frame when the node A sends the data frame; or in the process of receiving the data frame, the node B may measure the first time slot $T_{in}$ between sending of the adjacent data packets in the data frame.

S303: The slave node sends the control frame and the data frame to a next node.

Exemplarily, after receiving the control frame, the node B may insert a burst test packet in a time slot of any one data packet of the data frame, so that processing of the data frame is completed. Optionally, a test packet may be inserted in a time slot of a second data packet, and the processed data frame is sent to a node C. In the process of receiving the data frame, the node C may measure a time slot between a test packet in the data frame and a data packet prior to the test packet, and may measure, correspondingly, a time slot between a first data packet and the test packet to obtain a second time slot $T_{bin}$ between sending of the adjacent data packets in the data frame via the node B as shown in the bottom half part of FIG. 4. After obtaining the second time slot $T_{bin}$, the node C reports the second time slot $T_{bin}$ to the node A, such that the node A carries the second time slot $T_{bin}$ in the control frame sent to the node B subsequently; and after acquiring the second time slot $T_{bin}$, the node B may obtain a time slot difference between the two time slots according to the first time slot $T_{in}$ acquired in Step S302, and the time slot between sending of the adjacent data packets in the data frame may be adjusted to the first time slot $T_{in}$ according to the time slot difference in a subsequent process of sending the data frame by the node B. In this case, the node B completes a process of training sending time slot synchronization. Subsequently, the node B may receive and send the control frame and the data frame according to the reference time delay and the sending time slot difference obtained after training, thereby completing the process of training the time slot synchronization.

It can be understood that: the next node C of the node B and the remaining slave nodes may perform training according to similar processes in Step S302 and Step S303 so as to obtain a reference time delay and a sending time slot difference corresponding to the present node, and the control frame and the data frame are received and sent according to the reference time delay and the sending time slot difference, thereby completing the process of training the time slot synchronization. Specifically, it may be judged whether the next node is the master node, when a judgement result is that the next node is not the master node, Step S302 is returned so as to complete the time slot synchronization training process of the next slave node, and when a judgement result is that the next node is the master node, Step S304 is executed.

S304: When the control frame and the data frame are returned to the master node, the master node may obtain a reference time delay between receiving of the control frame and receiving of the data frame.

Specifically, in the embodiment, when the control frame and the data frame return to the node A, the node A may record time of receiving the frame header of the control frame and time of receiving the frame header of the data frame, wherein the control frame and the data frame are within one period. Moreover, a reference time delay $\Delta T_a$ between receiving of the control frame via the node A and receiving of the data frame via the node A is obtained. The detailed process is similar to Step S302, and will not be repeated here.

In this case, all nodes including the master node and the slave nodes in the entire network topological structure complete the process of training synchronization of receiving time slots and sending time slots. In subsequent network transmission, each node may receive and send the control frame and the data frame according to the reference time delay and the sending time slot obtained in training, and can ensure receiving synchronization and sending synchronization.

The embodiment of the present disclosure provides the method for training time slot synchronization of nodes in an OBTN. In the processes of receiving and sending the control frame and the data frame, each node trains the reference time delay between receiving of the control frame and receiving of the data frame, and trains the sending time slot between sending of the data packets in the data frame, so that it is unnecessary to use the FDL in organization of the OBTN, thereby reducing the cost of establishing the OBTN; and the distance between adjacent nodes can flexibly adapt to the network organization physical environment, and it is also unnecessary to strictly fix the distance relationship between the control channel and the data channel, thereby achieving flexible construction of the OBTN.

Figure 5:
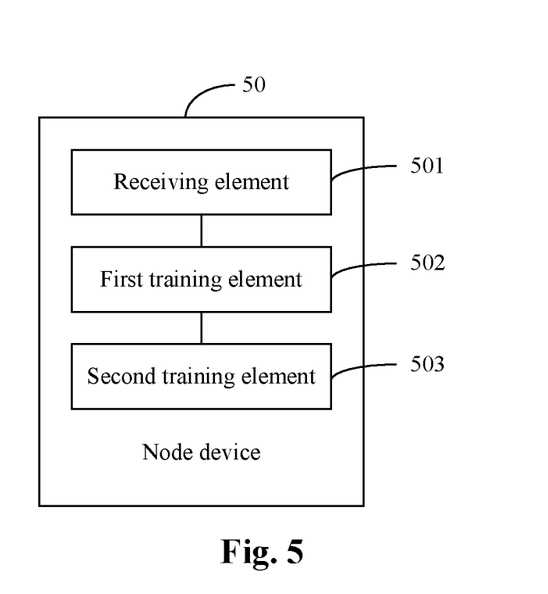
FIG. 5 is a structural diagram of a node device provided by an embodiment of the present disclosure.

FIG. 5 shows a node device 50 provided by an embodiment of the present disclosure. With reference to the application scenario shown in FIG. 1, the node device 50 may include:

a receiving element 501, configured to receive a control frame and a data frame;

a first training element 502, configured to train a reference time delay between receiving of a control frame via the receiving element 501 and receiving of a data frame via the receiving element 501, wherein the data frame and the control frame are within one period; and a second training element 503, configured to train a sending time slot between sending of adjacent data packets in the data frame.

Figure 6:
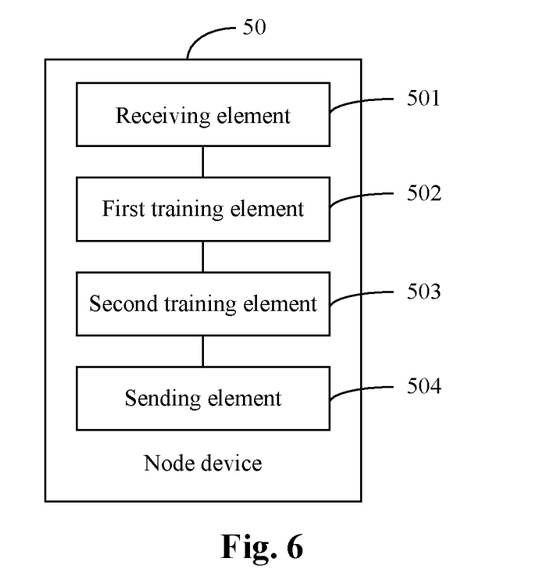
FIG. 6 is a structural diagram of another node device provided by an embodiment of the present disclosure.

Exemplarily, when the node device 50 is a master node such as a node A, as shown in FIG. 6, the node device 50 may further include a sending element 504, configured to send the data frame after a preset time interval with respect to time of sending the control frame. Specifically, after the sending element 504 sends a control frame to a node B via a control channel, a data frame is sent to the node B via a data channel after a preset time interval ΔT, so that after the node B receives the control frame, there may be sufficient time for the node B to process the control frame, and then to execute operations such as receiving, processing and sending the data frame; moreover, when the data frame is sent, a time slot between adjacent data packets in the data frame may be set as a first time slot $T_{in}$; and in this case, the second training element 503 may take the first time slot $T_{in}$ as a result of training a sending time slot between sending of the adjacent data packets in the data frame by the master node. In this case, the master node completes training the sending time slot between sending of the adjacent data packets in the data frame. Specifically, a diagram of a sending time sequence may be shown in an upper half part of FIG. 4. It may be understood that: the preset time interval ΔT and the first time slot $T_{in}$ may be considered as control information and written into the control frame.

Exemplarily, the master node and the slave nodes are included in a network shown in FIG. 1, and the first training element 502 of each of the master node and the slave nodes may be specifically configured to take a time delay, between first time at which a frame header of the control frame is received by the receiving element 501 and second time at which a frame header of the data frame is received by the receiving element 501, as the reference time delay between receiving of the control frame via the node and receiving of the data frame via the node.

Specifically, in the embodiment, for one of the slave nodes such as the node B, optionally, the first training element may record time $T_1$ of receiving the frame header of the control frame and may also record time $T_2$ of receiving the frame header of the data frame, wherein the control frame and the data frame are within one period. In this case, the reference time delay $\Delta T_b$, obtained by the first training element 502, between receiving of the control frame via the node B and receiving of the data frame via the node B may be $\Delta T_b = T_1 - T_2$.

In the embodiment, for one of the slave nodes such as the node B, optionally, the receiving element 501 receives the frame header of the control frame, and the first training element 502 acquires, from the control information in the control frame, the preset time interval ΔT between sending of the control frame via the node A and sending of the data frame via the node A. Due to the characteristic that a control channel and a data channel from the node A to the node B have different optical paths, and due to reasons such as time consumed by photoelectric conversion of the control frame, time consumed by the control frame from the node A to the node B is shorter than time consumed by the data frame by $T_{ab}$, and in this case, the reference time delay $\Delta T_b$, obtained by the first training element 502, between receiving of the control frame via the node B and receiving of the data frame via the node B may be $\Delta T_b = \Delta T - T_{ab}$.

Specifically, in the embodiment, for the master node such as the node A, the first training element 502 may record time of receiving the frame header of the control frame and time of receiving the frame header of the data frame, wherein the control frame and the data frame are within one period, thereby obtaining a reference time delay $\Delta T_a$ between receiving of the control frame via the node A and receiving of the data frame via the node A. The detailed process is similar to the description of the node B, and will not be repeated here.

It is important to note that: when the node device 50 receives the data frame in the future after learning the reference time delay between receiving of the control frame and receiving of the data frame, receiving time of receiving the frame header of the control frame is taken as a reference clock criterion, for the reference time delay after the reference clock criterion, a frame header of a data signal will appear is prejudged, and an accurate time point for receiving the data frame is presumed accordingly.

Figure 7:
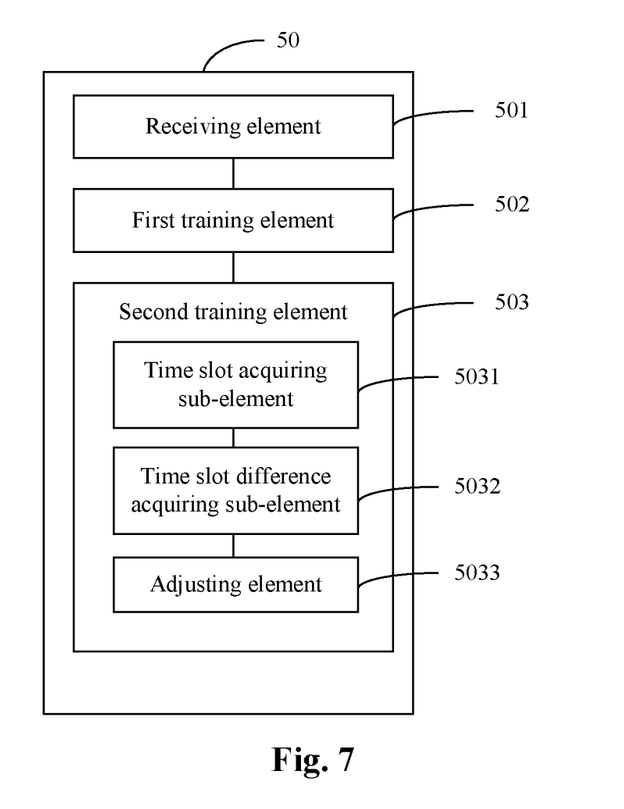
FIG. 7 is a structural diagram of another node device provided by an embodiment of the present disclosure.

Exemplarily, when the node device 50 is a slave node device such as the node B, as shown in FIG. 7, the second training element 503 may include:

a time slot acquisition sub-unit 5031, configured to acquire a first time slot and a second time slot of the adjacent data packets in the data frame;

a time slot difference acquiring sub-element 5032, configured to obtain a time slot difference of the slave node according to the first time slot and the second time slot; and an adjusting element 5033, configured to adjust the time slot between the adjacent data packets in the data frame to the first time slot according to the time slot difference when sending the data frame.

Furthermore, the time slot acquisition sub-unit 5031 may be configured to: acquire the first time slot from the control frame;

or receive a data frame sent after a previous node of the slave node completes training, and take a time slot between the adjacent data packets in the data frame as a first time slot.

Furthermore, the time slot acquisition sub-unit 5031 is configured to: insert a test data packet between a first data packet and a second data packet in the data frame to obtain a processed data frame;

send the processed data frame to a next node of the slave node; and receive the second time slot sent by the master node, wherein the second time slot is obtained according to a time slot between the first data packet and the test data packet when the next node of the slave node receives the processed data frame, and the next node of the slave node sends the second time slot to the master node, such that the master node sends the second time slot to the slave node.

Specifically, in the embodiment, the node B is taken as an example. In the process of receiving the data frame by the node B, the time slot acquisition sub-unit 5031 may acquire, according to the control information in the control frame, the first time slot $T_{in}$ between the adjacent data packets in the data frame when the node A sends the data frame; or in the process of receiving the data frame, the time slot acquisition sub-unit 5031 may measure the first time slot $T_{in}$ between the adjacent data packets in the data frame.

Specifically, in the embodiment, the node B is taken as an example. The time slot acquisition sub-unit 5031 may insert a burst test packet in a time slot of any one data packet of the data frame, so that processing of the data frame is completed. Optionally, a test packet may be inserted in a time slot of a second data packet, and the processed data frame is sent to a node C. In the process of receiving the data frame, the node C may measure a time slot between a test packet in the data frame and a data packet prior to the test packet, and may measure, correspondingly, a time slot between a first data packet and the test packet to obtain a second time slot $T_{bin}$ of sending the adjacent data packets in the data frame via the node B as shown in a bottom half part of FIG. 4. After obtaining the second time slot $T_{bin}$, the node C reports the second time slot $T_{bin}$ to the node A, such that the node A carries the second time slot $T_{bin}$ in the control frame sent to the node B subsequently After the time slot acquisition sub-unit 5031 acquires the second time slot $T_{bin}$, the time slot difference acquiring sub-element 5032 may obtain a time slot difference between the two time slots according to the acquired first time slot $T_{in}$.

In a subsequent process of sending the data frame by the node B, the adjusting element 5033 may adjust the time slot of the adjacent data packets in the data frame to the first time slot $T_{in}$ according to the time slot difference. In this case, the second training element 503 completes a process of training the sending time slot synchronization. In this case, the first training element 502 and the second training element 503 of one of the slave nodes complete the time slot synchronization training process.

It can be understood that: the next node of the node B and the remaining nodes may complete the time slot synchronization training process by means of respective first training elements 502 and second training elements 503, which will not be repeated here.

In practical application, the receiving element 501 may be implemented by a receiver in the node device; the first training element may be implemented by a Central Processing Unit (CPU), a Digital Signal Processor (DSP) or a Field-Programmable Gate Array (FPGA) in the node device; the second training element 503 may be implemented by the CPU, the DSP or the FPGA as well as the receiver in the node device; and the sending element 504 may be implemented by a transmitter in the node device.

The node device 50 provided by the embodiment of the present disclosure, in the processes of receiving and sending the control frame and the data frame, trains the reference time delay between receiving of the control frame and receiving of the data frame, and trains the sending time slot between sending of the data packets in the data frame, so that it is unnecessary to use the FDL in organization of the OBTN, thereby reducing the cost for establishing the OBTN; and the distance between adjacent nodes can flexibly adapt to the network organization physical environment, and it is also unnecessary to strictly fix the distance relationship between the control channel and the data channel, thereby achieving flexible construction of the OBTN.

Figure 8:
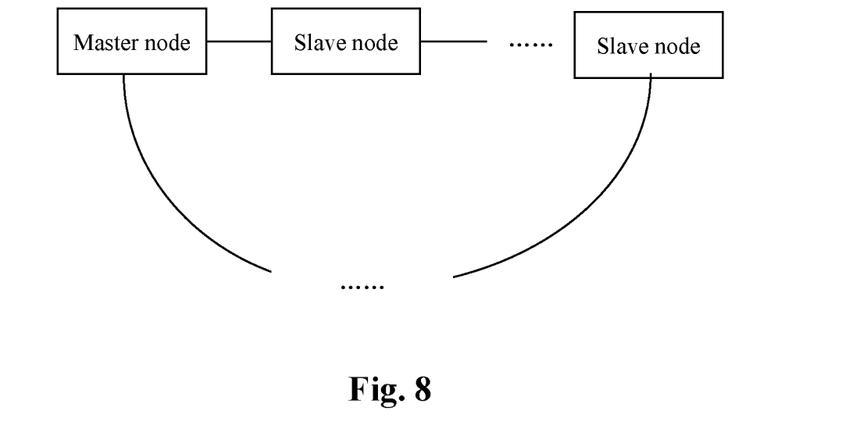
FIG. 8 is a structural diagram of an OBTN provided by an embodiment of the present disclosure.

FIG. 8 shows an OBTN provided by an embodiment of the present disclosure. The OBTN includes the master node according to any one of the above embodiments and at least one slave node according to any one of the above embodiments.

In the processes of receiving and sending the control frame and the data frame, each node in the OBTN provided by the embodiment of the present disclosure trains the reference time delay between receiving of the control frame and receiving of the data frame, and trains the sending time slot of sending the data packets in the data frame, so that it is unnecessary to use the FDL in organization of the OBTN, thereby reducing the cost for establishing the OBTN; and the distance between adjacent nodes can flexibly adapt to the network organization physical environment, and it is also unnecessary to strictly fix the distance relationship between the control channel and the data channel, thereby achieving flexible construction of the OBTN.

In some embodiments provided by the present disclosure, it shall be understood that the disclosed system, device and method may be implemented in other modes. For example, the devices embodiment described above is merely schematic. For example, the division of the components or elements is merely the division of logical functions, and there may be additional division modes during practical implementation. For example, a plurality of elements or assemblies may be combined or integrated to another system, or some characteristics may be omitted or may be not executed; and in addition, displayed or discussed mutual coupling or direct coupling or communication connection may be performed via some interfaces, and indirect coupling or communication connection between devices or elements may be in an electrical form, a mechanical form or other forms.

The elements illustrated as separate components may be or may not be physically separated. Components for element display may be or may not be physical elements. That is, the components may be located at a place or may be distributed on a plurality of network elements. The aims of the solutions of the embodiments may be achieved by selecting some or all units according to actual requirements.

In addition, all function elements in all embodiments of the present disclosure may be integrated in a processing element, or each element may exist separately and physically, or two or more elements may be integrated in an element. The integrated element may be implemented in a hardware form or may be implemented in a software function unit form.

If the integrated unit is implemented in the software function unit form and is sold or used as an independent product, the product may be stored in a computer readable storage medium. Based on this understanding, the technical solutions of the present disclosure may be substantially embodied in a software product form or parts contributing to the traditional art or all or some of the technical solutions may be embodied in the software product form, and a computer software product is stored in a storage medium, including a plurality of instructions enabling a computer device, which may be a personal computer, a server or a network device, or a processor to execute all or some of the steps of the method according to each embodiment of the present disclosure. The storage medium includes: various media capable of storing program codes, such as a U disk, a mobile hard disk, a Read-Only Memory (ROM), a disk or an optical disc.

Those skilled in the art shall understand that the embodiments of the present disclosure may provide a method, a system or a computer program product. Thus, forms of hardware embodiments, software embodiments or embodiments integrating software and hardware may be adopted in the present disclosure. Moreover, a computer program product form implemented on one or more computer available storage media (including, but not limited to, a disk memory, an optical memory and the like) containing computer available program codes may be adopted in the present disclosure.

The present disclosure is described with reference to flowcharts and/or block diagrams of the method, the device (system) and the computer program product according to the embodiments of the present disclosure. It shall be understood that each flow and/or block in the flowcharts and/or the block diagrams and a combination of the flows and/or the blocks in the flowcharts and/or the block diagrams may be implemented by computer program instructions. These computer program instructions may be provided for a general computer, a dedicated computer, an embedded processor or processors of other programmable data processing devices to generate a machine, so that a device for achieving functions designated in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, so that a manufactured product including an instruction apparatus is generated via the instructions stored in the computer readable memory, and the instruction apparatus achieves the functions designated in one or more flows of the flowcharts and/or one or more blocks of the block diagrams.

These computer program instructions may also be loaded to the computers or the other programmable data processing devices, so that processing implemented by the computers is generated by executing a series of operation steps on the computers or the other programmable devices, and therefore the instructions executed on the computers or the other programmable devices provide a step of achieving the functions designated in one or more flows of the flowcharts and/or one or more blocks of the block diagrams.

The above is only the specific implementation modes of the present disclosure. However, the protection scope of the present disclosure is not limited thereto. Those skilled in the art may easily think of variations or replacements within the disclosed technical scope of the present disclosure. These variations or replacements shall fall within the protection scope of the present disclosure. Thus, the protection scope of the present disclosure shall refer to the protection scope of the claims.

What is claimed is:

1. A method for training time slot synchronization of nodes in an Optical Burst Transport Network (OBTN), comprising:

training, by a node, a reference time delay between receiving of a control frame and receiving of a data frame, wherein the data frame and the control frame are within one period; and training, by the node, a sending time slot between sending of adjacent data packets in the data frame;

wherein when the node is a slave node, training, by the node, the sending time slot between sending of the adjacent data packets in the data frame comprises: acquiring, by the slave node, a first time slot and a second time slot between adjacent data packets in the data frame; obtaining, by the slave node, a time slot difference of the slave node according to the first time slot and the second time slot; and adjusting, by the slave node, the sending time slot between sending of the adjacent data packets in the data frame to the first time slot according to the time slot difference when sending the data frame.

2. The method as claimed in claim 1, wherein training, by the node, the reference time delay between receiving of the control frame and receiving of the data frame comprises:

taking, by the node, a time delay, between first time at which a frame header of the control frame is received and second time at which a frame header of the data frame is received, as the reference time delay between receiving of the control frame by the node and receiving of the data frame by the node.

3. The method as claimed in claim 1, wherein when the node is a master node, training, by the node, the sending time slot between sending of the adjacent data packets in the data frame comprises:

setting, by the master node, the sending time slot between sending of the adjacent data packets in the data frame as a first time slot.

4. The method as claimed in claim 1, when the node is the master node, further comprising:

sending, by the master node, the data frame after a preset time interval with respect to time of sending the control frame.

5. The method as claimed in claim 1, wherein acquiring, by the slave node, the first time slot between of sending the adjacent data packets in the data frame comprises:

acquiring, by the slave node, the first time slot from the control frame;

or receiving, by the slave node, a data frame sent after a previous node of the slave node completes training; and taking, by the slave node, a time slot between adjacent data packets in the received data frame as the first time slot.

6. The method as claimed in claim 1, wherein acquiring, by the slave node, the second time slot between receiving of the adjacent data packets in the data frame comprises:

inserting, by the slave node, a test data packet between a first data packet and a second data packet in the data frame to obtain a processed data frame;

sending, by the slave node, the processed data frame to a next node of the slave node; and receiving, by the slave node, the second time slot sent by the master node, wherein the second time slot is obtained according to a time slot between the first data packet and the test data packet when the next node of the slave node receives the processed data frame, and the next node of the slave node sends the second time slot to the master node, to enable the master node to send the second time slot to the slave node.

7. A node device, comprising: a hardware processor, configured to perform programming components stored in a memory, wherein the programming components comprise:

a receiving element, configured to receive a control frame and a data frame;

a first training element, configured to train a reference time delay between receiving of a control frame via the receiving element and receiving of a data frame via the receiving element, wherein the data frame and the control frame are within one period; and a second training element, configured to train a sending time slot between sending of adjacent data packets in the data frame;

wherein when the node device is a slave node, the second training element comprises: a time slot acquiring sub-element, configured to acquire a first time slot and a second time slot of the adjacent data packets in the data frame; a time slot difference acquiring sub-element, configured to obtain a time slot difference of the slave node according to the first time slot and the second time slot; and an adjusting element, configured to adjust a time slot between sending of the adjacent data packets in the data frame to the first time slot according to the time slot difference when sending the data frame.

8. The node device as claimed in claim 7, wherein the first training element is configured to take a time delay, between first time at which a frame header of the control frame is received by the receiving element and second time at which a frame header of the data frame is received by the receiving element, as the reference time delay between receiving of the control frame by the node and receiving of the data frame by the node.

9. The node device as claimed in claim 7, wherein when the node device is a master node, the second training element is configured to set the sending time slot between sending of the adjacent data packets in the data frame as a first time slot.

10. The node device as claimed in claim 7, wherein when the node device is a master node, the node device further comprises a sending element, configured to send the data frame after a preset time interval with respect to time of sending the control frame.

11. The node device as claimed in claim 7, wherein the time slot acquiring sub-element is configured to: acquire the first time slot from the control frame;

or receive a data frame sent after a previous node of the slave node completes training, and take a time slot between adjacent data packets in the received data frame as the first time slot.

12. The node device as claimed in claim 7, wherein the time slot acquiring sub-element is configured to: insert a test data packet between a first data packet and a second data packet in the data frame to obtain a processed data frame; send the processed data frame to a next node of the slave node; and receive the second time slot sent by the master node, wherein the second time slot is obtained according to a time slot between the first data packet and the test data packet when the next node of the slave node receives the processed data frame, and the next node of the slave node sends the second time slot to the master node, to enable the master node to send the second time slot to the slave node.

13. An Optical Burst Transport Network (OBTN), comprising a master node device and a slave node device, wherein the master node device comprises the node device as claimed in claim 7, and the slave node device comprises the node device as claimed in claim 7.

14. The method as claimed in claim 2, when the node is the master node, further comprising:

sending, by the master node, the data frame after a preset time interval with respect to time of sending the control frame.

15. The method as claimed in claim 3, when the node is the master node, further comprising:

sending, by the master node, the data frame after a preset time interval with respect to time of sending the control frame.

16. The node device as claimed in claim 8, wherein when the node device is a master node, the node device further comprises a sending element, configured to send the data frame after a preset time interval with respect to time of sending the control frame.

17. The node device as claimed in claim 9, wherein when the node device is a master node, the node device further comprises a sending element, configured to send the data frame after a preset time interval with respect to time of sending the control frame.

* * * * *